UNITED STATES PATENT OFFICE.

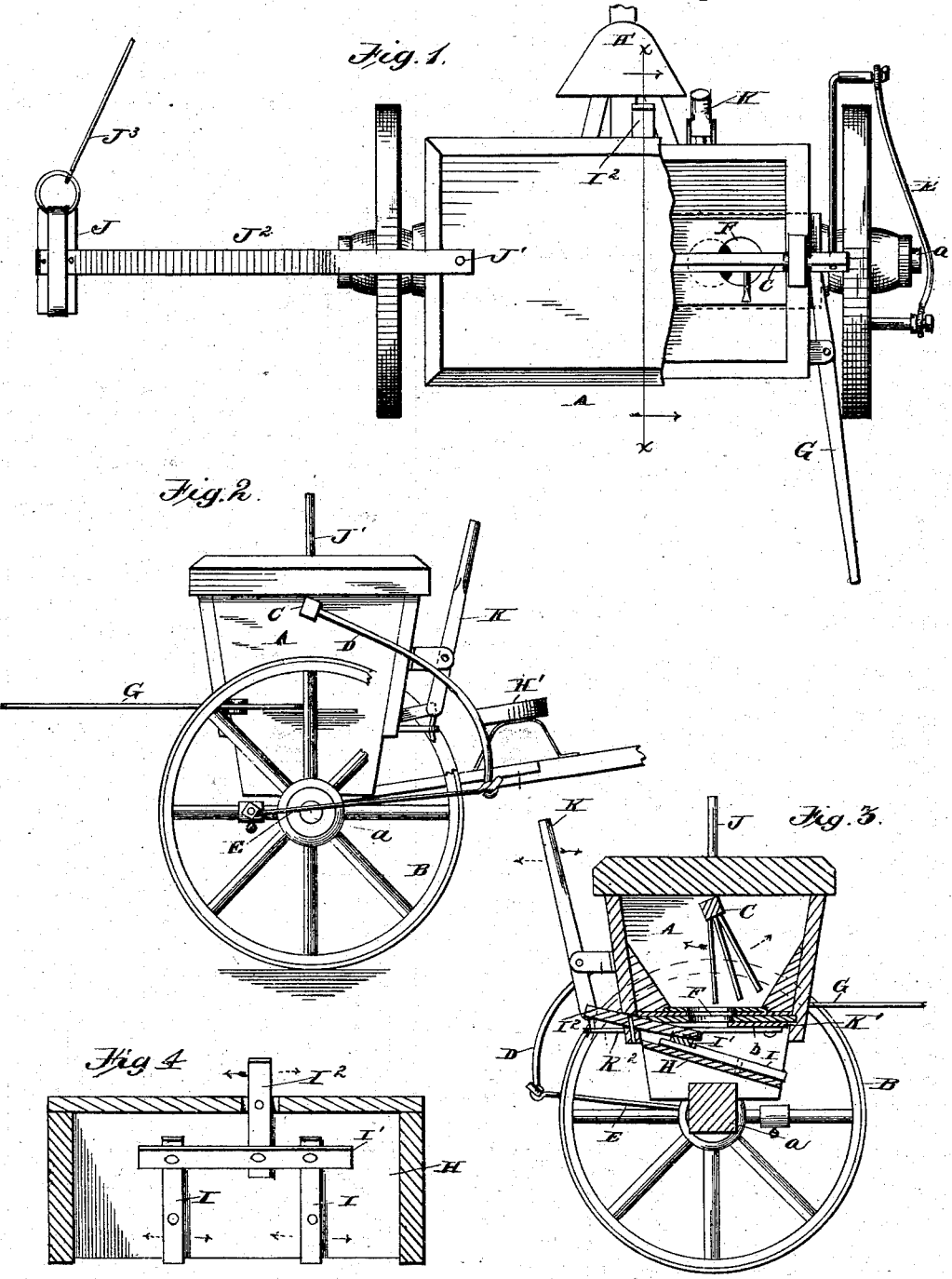

CHARLES MITCHELL, OF SHENANDOAH, IOWA.

SEED-PLANTER.

SPECIFICATION forming part of Letters Patent No. 276,266, dated April 24, 1883.

Application filed December 23, 1882. (No model.)

*To all whom it may concern:*

Be it known that I, CHARLES MITCHELL, a citizen of the United States, residing at Shenandoah, in the county of Page and State of Iowa, have invented certain new and useful Improvements in Seed-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention pertains to improvements in seed-planters and markers, having for its object to facilitate the planting of the corn or seed, and the simultaneous marking of the ground for the prospective row of corn; and it consists in the combination and arrangement of parts, substantially as hereinafter more fully set forth and claimed.

In the accompanying drawings, Figure 1 is a plan view, partly broken away, of my improved combined corn-planter and marker. Fig. 2 is an end view, also partly broken away, of the same. Fig. 3 is a sectional elevation, and Fig. 4 is a top plan view of the incline with the hopper removed.

In carrying out my invention I employ a seed or corn hopper, A, mounted upon an axle, $a$, which is provided with wheels B B. To the axle is applied the usual tongue for connecting the team to the planter.

C is the agitator-bar, hung in the ends of the seed or corn hopper, said bar having a series of fingers to loosen the corn or seed and pass the same through the dropping apertures of the seed or corn hopper. The inner sides of the seed-hopper are adapted to incline toward the seed or corn dropping openings in its bottom, to facilitate the escape or dropping of the seed. The agitator-bar receives its motion—a reciprocating one—by means of a crank-connection with one of the driving-wheels. This connection consists of a downwardly-curved bar, D, reaching a suitable distance forward and connecting with a rod or pitman, E, said pitman being pivoted to the sleeve or clamp rigidly secured to a spoke of one of the driving-wheels.

Arranged underneath the apertured bottom of the seed-hopper is a correspondingly-apertured slide, F, to open and close the seed openings in the hopper-bottom as desired, it being capable of operation by a hand-lever, G, connected thereto by a link or plate, $b$, said lever being pivoted to the front of the hopper A. Upon the tongue, near this lever, is the driver's seat H', thus disposed to conveniently effect the operation of said lever as well as to permit the driving of the team.

Disposed beneath the hopper A, and connected thereto by end pieces, is an incline, H, sloping rearward, upon which the seed or corn falls from the hopper, whence it falls upon the ground.

I I are two bars or conductors pivoted to the incline H, and connected together by a cross-bar, I', to which is secured a lever, $I^2$, extending out through the front of the hopper, below its bottom, to permit its convenient operation by the foot as it is desired to change the direction of the dropping of the grain.

J is a marker in the form of a runner, arranged to mark the ground in parallel lines to drive by and secure an even sowing of the seed, said marker being connected to a pin, J', on the top of the hopper A by a bar, $J^2$, and to the hame of one of the horses by a chain, $J^3$, or other suitable means.

K is a lever operating a slide, K', adapted also to open or close the corn-dropping openings in the seed-hopper, it being connected to said slide by a link, $K^2$.

Changes in the form and method of connecting the parts may be made without departing from the principle or sacrificing the advantages of my invention.

Having thus fully described my invention, I claim and desire to secure by Letters Patent—

1. In a corn-dropper, the combination, with the hopper A, its longitudinal axis being in a line with the axle $a$, and having the agitator C, provided with a series of stirrers, of the pitman E, connected to one of the spokes of the driving-wheel B by means of a detachable clamp rigidly secured by a screw, and a connecting-link, D, projecting forwardly and downwardly, and pivoted to the forwardly-projecting end of the pitman, as and for the purposes set forth.

2. In a corn-planter, the combination, with the incline H, arranged under the hopper and fixed thereto, of the conductors I I I', with handle I², substantially as and for the purpose set forth.

In testimony whereof I affix my signature in presence of two witnesses.

CHARLES MITCHELL.

Witnesses:
  J. R. BADHAN,
  ALBERT V. VINCENT.